(12) United States Patent
Kobayashi et al.

(10) Patent No.: US 8,860,888 B2
(45) Date of Patent: Oct. 14, 2014

(54) METHOD AND APPARATUS FOR POWER SAVING DURING VIDEO BLANKING PERIODS

(75) Inventors: Osamu Kobayashi, Los Altos, CA (US); Gyo Un Choi, Cupertino, CA (US)

(73) Assignee: STMicroelectronics, Inc., Coppell, TX (US)

( * ) Notice: Subject to any disclaimer, the term of this patent is extended or adjusted under 35 U.S.C. 154(b) by 573 days.

(21) Appl. No.: 12/711,597

(22) Filed: Feb. 24, 2010

(65) Prior Publication Data

US 2010/0289945 A1  Nov. 18, 2010

Related U.S. Application Data

(60) Provisional application No. 61/177,979, filed on May 13, 2009.

(51) Int. Cl.
*H04N 5/63* (2006.01)
*G06F 1/32* (2006.01)

(52) U.S. Cl.
CPC ............ *G06F 1/3265* (2013.01); *G06F 1/3218* (2013.01); *Y02B 60/1242* (2013.01)
USPC ............................. 348/730; 348/636; 348/725

(58) Field of Classification Search
USPC ......... 348/730, 441, 521, 522, 525–526, 604, 348/725, 636; 345/211, 204, 212, 222
IPC ....................................... H04N 5/63,7/01, 3/24
See application file for complete search history.

(56) References Cited

U.S. PATENT DOCUMENTS

| 4,479,142 | A |   | 10/1984 | Buschman et al. |
| 4,796,203 | A |   | 1/1989 | Roberts |
| 5,245,612 | A |   | 9/1993 | Kachi et al. |
| 5,258,983 | A |   | 11/1993 | Lane et al. |
| 5,369,775 | A |   | 11/1994 | Yamasaki et al. |
| 5,425,101 | A |   | 6/1995 | Woo et al. |
| 5,483,291 | A | * | 1/1996 | Karlock ......................... 348/525 |
| 5,515,296 | A |   | 5/1996 | Agarwal |
| 5,537,650 | A |   | 7/1996 | West et al. |

(Continued)

FOREIGN PATENT DOCUMENTS

| CN | 1353513 | 6/2002 |
| EP | 0 354 480 A | 2/1990 |

(Continued)

OTHER PUBLICATIONS

Extended Search Report dated Aug. 2, 2010 from European Application No. 10159142.8.

(Continued)

*Primary Examiner* — Trang U Tran
(74) *Attorney, Agent, or Firm* — Seed IP Law Group PLLC

(57) ABSTRACT

Methods and systems are described for enabling display system power saving during the operation of display devices. An integrated circuit package includes input interface circuitry configured to receive an audio-video data stream having a video signal and timing information and timing extraction circuitry that can identify blanking patterns for the video signal. The package includes timing control circuitry configured to implement a power saving process during the blanking periods of the video signal. The invention further includes methods that support the operation of power saving processes.

21 Claims, 7 Drawing Sheets

(56) References Cited

U.S. PATENT DOCUMENTS

| | | | |
|---|---|---|---|
| 5,541,919 A | 7/1996 | Yong et al. | |
| 5,552,836 A * | 9/1996 | Nobuoka | 348/730 |
| 5,608,418 A | 3/1997 | McNally | |
| 5,615,376 A | 3/1997 | Ranganathan | |
| 5,625,379 A | 4/1997 | Reinert et al. | |
| 5,629,715 A | 5/1997 | Zenda | |
| 5,670,973 A | 9/1997 | Bassetti, Jr. et al. | |
| 5,736,873 A * | 4/1998 | Hwang | 327/41 |
| 5,739,803 A | 4/1998 | Neugebauer | |
| 5,745,837 A | 4/1998 | Fuhrmann | |
| 5,790,083 A | 8/1998 | Bassetti | |
| 5,805,173 A | 9/1998 | Glennon et al. | |
| 5,838,875 A | 11/1998 | Cho et al. | |
| 5,852,630 A | 12/1998 | Langberg et al. | |
| 5,909,465 A | 6/1999 | Bottomley et al. | |
| 5,918,002 A | 6/1999 | Klemets et al. | |
| 5,926,155 A | 7/1999 | Arai et al. | |
| 5,940,137 A | 8/1999 | Hulvey | |
| 5,949,437 A | 9/1999 | Clark | |
| 6,005,861 A | 12/1999 | Humpleman | |
| 6,020,901 A | 2/2000 | Lavelle et al. | |
| 6,038,000 A | 3/2000 | Hurst, Jr. | |
| 6,049,316 A | 4/2000 | Nolan et al. | |
| 6,049,769 A | 4/2000 | Holmes et al. | |
| 6,069,929 A | 5/2000 | Yabe et al. | |
| 6,151,334 A | 11/2000 | Kim et al. | |
| 6,151,632 A | 11/2000 | Chaddha et al. | |
| 6,154,225 A | 11/2000 | Kou et al. | |
| 6,175,573 B1 | 1/2001 | Togo et al. | |
| 6,177,922 B1 | 1/2001 | Schiefer et al. | |
| 6,219,736 B1 | 4/2001 | Klingman | |
| 6,223,089 B1 | 4/2001 | Page | |
| 6,249,319 B1 | 6/2001 | Post | |
| 6,326,961 B1 | 12/2001 | Lin et al. | |
| 6,330,605 B1 | 12/2001 | Christensen et al. | |
| 6,337,964 B2 | 1/2002 | Inami et al. | |
| 6,353,594 B1 | 3/2002 | Tooker et al. | |
| 6,356,260 B1 | 3/2002 | Montalbo | |
| 6,437,768 B1 | 8/2002 | Kubota et al. | |
| 6,441,857 B1 | 8/2002 | Wicker et al. | |
| 6,446,130 B1 | 9/2002 | Grapes | |
| 6,477,252 B1 | 11/2002 | Faber et al. | |
| 6,542,967 B1 | 4/2003 | Major | |
| 6,543,053 B1 | 4/2003 | Li et al. | |
| 6,545,688 B1 | 4/2003 | Loveridge et al. | |
| 6,577,303 B2 | 6/2003 | Kim | |
| 6,587,480 B1 | 7/2003 | Higgins et al. | |
| 6,598,161 B1 | 7/2003 | Kluttz et al. | |
| 6,600,469 B1 | 7/2003 | Nukiyama et al. | |
| 6,608,828 B1 | 8/2003 | Balachandran | |
| 6,614,800 B1 | 9/2003 | Genty et al. | |
| 6,661,422 B1 | 12/2003 | Valmiki et al. | |
| 6,697,376 B1 | 2/2004 | Son et al. | |
| 6,704,310 B1 | 3/2004 | Zimmermann et al. | |
| 6,765,931 B1 | 7/2004 | Rabenko et al. | |
| 6,778,168 B2 | 8/2004 | Mamiya et al. | |
| 6,862,606 B1 | 3/2005 | Major et al. | |
| 6,865,188 B1 | 3/2005 | Stirling et al. | |
| 6,873,625 B1 | 3/2005 | Yoo et al. | |
| 6,903,716 B2 | 6/2005 | Kawabe et al. | |
| 6,909,442 B2 | 6/2005 | Hiyama et al. | |
| 6,914,637 B1 | 7/2005 | Wolf et al. | |
| 6,963,968 B2 | 11/2005 | Kori | |
| 6,973,069 B1 | 12/2005 | Spear et al. | |
| 6,975,645 B1 | 12/2005 | Suzuki et al. | |
| 7,046,631 B1 | 5/2006 | Giroux et al. | |
| 7,075,987 B2 | 7/2006 | Kim et al. | |
| 7,099,277 B2 | 8/2006 | Sahinoglu et al. | |
| 7,136,415 B2 | 11/2006 | Yun et al. | |
| 7,177,329 B2 * | 2/2007 | Kobayashi | 370/524 |
| 7,194,554 B1 | 3/2007 | Short et al. | |
| 7,196,701 B2 * | 3/2007 | Tsutsui et al. | 345/211 |
| 7,212,185 B2 * | 5/2007 | Yanagi et al. | 345/99 |
| 7,248,590 B1 | 7/2007 | Liu | |
| 7,256,790 B2 | 8/2007 | Valmiki et al. | |
| 7,295,578 B1 | 11/2007 | Lyle et al. | |
| 7,525,975 B2 | 4/2009 | Caspi et al. | |
| 2001/0030649 A1 | 10/2001 | Mamiya et al. | |
| 2001/0036193 A1 | 11/2001 | Kori | |
| 2001/0038387 A1 | 11/2001 | Tomooka et al. | |
| 2001/0052011 A1 | 12/2001 | Nagao | |
| 2002/0007452 A1 | 1/2002 | Traw et al. | |
| 2002/0011996 A1 | 1/2002 | Inoue et al. | |
| 2002/0060676 A1 | 5/2002 | Kim | |
| 2002/0061024 A1 | 5/2002 | Malkemes et al. | |
| 2002/0062394 A1 | 5/2002 | Bunn et al. | |
| 2002/0071055 A1 | 6/2002 | Ooshima et al. | |
| 2002/0071390 A1 | 6/2002 | Reeves et al. | |
| 2002/0075902 A1 | 6/2002 | Abbas et al. | |
| 2002/0080468 A1 | 6/2002 | Crummey et al. | |
| 2002/0085582 A1 | 7/2002 | Kim | |
| 2002/0089517 A1 | 7/2002 | Ludtke et al. | |
| 2002/0122515 A1 | 9/2002 | Bodenschatz | |
| 2002/0136219 A1 | 9/2002 | Ding et al. | |
| 2002/0149617 A1 | 10/2002 | Becker | |
| 2002/0163598 A1 | 11/2002 | Pasqualino | |
| 2002/0164022 A1 | 11/2002 | Strasser et al. | |
| 2002/0184327 A1 | 12/2002 | Major et al. | |
| 2002/0190974 A1 | 12/2002 | Morita | |
| 2002/0190978 A1 | 12/2002 | Agarwal et al. | |
| 2003/0035442 A1 | 2/2003 | Eng | |
| 2003/0048852 A1 | 3/2003 | Hwang et al. | |
| 2003/0063077 A1 | 4/2003 | Koyama | |
| 2003/0076282 A1 | 4/2003 | Ikeda et al. | |
| 2003/0080971 A1 | 5/2003 | Hochmuth et al. | |
| 2003/0112822 A1 | 6/2003 | Hong et al. | |
| 2003/0145258 A1 | 7/2003 | Warner et al. | |
| 2003/0149987 A1 | 8/2003 | Pasqualino et al. | |
| 2003/0152160 A1 | 8/2003 | Bauch et al. | |
| 2003/0174156 A1 | 9/2003 | Katsuhara et al. | |
| 2003/0174795 A1 | 9/2003 | Bruhnke et al. | |
| 2003/0177423 A1 | 9/2003 | Komatsu et al. | |
| 2003/0212811 A1 | 11/2003 | Thornton | |
| 2004/0049705 A1 | 3/2004 | Liebenow | |
| 2004/0080671 A1 | 4/2004 | Siemens et al. | |
| 2004/0081151 A1 | 4/2004 | Greis et al. | |
| 2004/0088469 A1 | 5/2004 | Levy | |
| 2004/0103333 A1 | 5/2004 | Martwick et al. | |
| 2004/0114607 A1 | 6/2004 | Shay et al. | |
| 2004/0198386 A1 | 10/2004 | Dupray | |
| 2004/0203383 A1 | 10/2004 | Kelton et al. | |
| 2004/0210805 A1 | 10/2004 | Kimelman et al. | |
| 2004/0218598 A1 | 11/2004 | Kobayashi | |
| 2004/0218599 A1 | 11/2004 | Kobayashi | |
| 2004/0218624 A1 | 11/2004 | Kobayashi | |
| 2004/0218625 A1 | 11/2004 | Kobayashi | |
| 2004/0218627 A1 | 11/2004 | Kobayashi | |
| 2004/0221056 A1 | 11/2004 | Kobayashi | |
| 2004/0221180 A1 | 11/2004 | Enami et al. | |
| 2004/0221312 A1 | 11/2004 | Kobayashi | |
| 2004/0221315 A1 | 11/2004 | Kobayashi | |
| 2004/0228365 A1 | 11/2004 | Kobayashi | |
| 2004/0233181 A1 | 11/2004 | Kobayashi | |
| 2004/0240454 A1 | 12/2004 | Yamauchi et al. | |
| 2004/0243905 A1 | 12/2004 | Merritt | |
| 2005/0062699 A1 | 3/2005 | Kobayashi | |
| 2005/0062711 A1 | 3/2005 | Kobayashi | |
| 2005/0066085 A1 | 3/2005 | Kobayashi | |
| 2005/0103333 A1 | 5/2005 | Bonutti | |
| 2005/0225547 A1 | 10/2005 | Choi | |
| 2006/0036788 A1 | 2/2006 | Galang et al. | |
| 2006/0059092 A1 | 3/2006 | Burshan et al. | |
| 2006/0117371 A1 | 6/2006 | Margulis | |
| 2006/0209890 A1 | 9/2006 | MacMullan et al. | |
| 2007/0049086 A1 | 3/2007 | Sakane | |
| 2007/0097885 A1 | 5/2007 | Traversat et al. | |
| 2007/0140298 A1 | 6/2007 | Eng | |
| 2008/0175277 A1 | 7/2008 | Yin et al. | |
| 2008/0273602 A1 | 11/2008 | Glen | |
| 2008/0284761 A1 | 11/2008 | Knee et al. | |

(56) References Cited

U.S. PATENT DOCUMENTS

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| GB | 2 329 741 A | 3/1999 |
| JP | 03/153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO95/13681 | 5/1995 |
| WO | WO98/41008 | 9/1998 |
| WO | WO99/63513 | 12/1999 |
| WO | WO00/20974 | 4/2000 |
| WO | WO02/25822 A2 | 3/2002 |
| WO | WO02/25885 | 3/2002 |
| WO | WO02/65746 | 8/2002 |
| WO | WO03/058376 | 7/2003 |

OTHER PUBLICATIONS

U.S. Appl. No. 61/179,289, filed May 18, 2009.
U.S. Appl. No. 61/179,292, filed May 18, 2009.
U.S. Appl. No. 61/179,293, filed May 18, 2009.
U.S. Appl. No. 61/179,295, filed May 18, 2009.
Office Action dated Mar. 9, 2010 in U.S. Appl. No. 10/726,794.
Office Action dated Sep. 17, 2009 in U.S. Appl. No. 10/726,794.
Office Action dated Apr. 2, 2009 in U.S. Appl. No. 10/726,794.
Search Report dated Oct. 12, 2005 from Singapore Patent Application No. 200405115-7.
Office Action mailed Jun. 27, 2007 from U.S. Appl. No. 10/726,794.
Office Action mailed Nov. 27, 2007 from U.S. Appl. No. 10/726,794.
Office Action dated Mar. 31, 2008 from U.S. Appl. No. 10/726,794.
Office Action dated Jun. 24, 2008 from U.S. Appl. No. 10/726,794.
Office Action dated Sep. 11, 2009 in U.S. Appl. No. 10/726,441.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Office Action dated Sep. 10, 2009 in U.S. Appl. No. 10/909,027.
Universal Serial Bus Specification, Revision 2.0, Apr. 27, 2000, p. 143.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Office Action dated Sep. 21, 2009 in U.S. Appl. No. 10/726,895.
Barr, "Protection for High-Definition Baseband Video," Information Technology: Coding and Computing [online at http://ieeexplore.ieee.org/stamp/stamp.jsp?arnumber=844202&isnumber=18266, Aug. 6, 2002.
Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.
Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 4, 2009 in U.S. Appl. No. 10/726,350.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 6, 2009 in U.S. Appl. No. 10/909,027.
Office Action dated May 26, 2009 in U.S. Appl. No. 11/742,222.
Office Action dated Apr. 4, 2008 in CN Patent Application No. 200410043419.1.
Office Action dated Sep. 12, 2008 in CN Patent Application No. 200410044503.5.
Office Action dated Oct. 8, 2009 in U.S. Appl. No. 11/776,411.
Examination Report dated Mar. 1, 2006 from Singapore Patent Application No. 200402057-4.
Search Report dated Mar. 15, 2006 from European Patent Application No. 04255610.0.
Austrian Search and Exam Report dated Feb. 16, 2007 issued in corresponding Singapore Application No. 200401973-3.
Office Action mailed Jul. 9, 2007 from related U.S. Appl. No. 10/726,895.
Office Action mailed Dec. 28, 2007 from U.S. Appl. No. 10/726,895.
Office Action dated Aug. 6, 2008 from U.S. Appl. No. 10/726,895.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Kobayashi, "DisplayPort Technical Overview," http://web.archive.org/web/20060726222849/http://gnss.com/technology/DisplayPort+Technical+Overview+White+Paper.pdf, Jun. 26, 2006.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
High-Definition Multimedia Interface Specification, Informational Version 1.0, Sep. 4, 2003, 52 pgs.
International Search Report in related Chinese Application No. 200410044503.5 dated Jun. 29, 2007.
"CLUT," http://en.wikipedia.org/wiki/CLUT.
"Packet," http://en.wikipedia.org/wiki/Packet.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Eidson et al., "30.2: HDMI: High-Definition Multimedia Interface," Silicon Image, Inc., Sunnyvale, CA, SID 03 Digest, 2003, pp. 1024-1027.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Chang et al., "Digital Visual Interface," Technology Brief, Dell, May 2000.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from European Patent Application No. 04255609.2.
Office Action mailed Dec. 5, 2006 from U.S. Appl. No. 10/726,802.
VESA Display Port Standard, Version 1.1, Mar. 19, 2007.
Office Action mailed Jun. 26, 2007 from U.S. Appl. No. 10/762,680.

(56) References Cited

OTHER PUBLICATIONS

EPO Exam Report in EP Application No. 04255786.8 dated Jul. 5, 2007.
Final Rejection mailed Sep. 21, 2007 from U.S. Appl. No. 10/909,103.
Notice of Allowance mailed Sep. 24, 2007 in U.S. Appl. No. 10/726,802.
Office Action dated Nov. 2, 2007 from Chinese Patent Application No. 2004100950502.4.
Supplemental Notice of Allowance mailed Nov. 6, 2007 in U.S. Appl. No. 10/726,802.
Office Action mailed Nov. 26, 2007 from U.S. Appl. No. 10/909,027.
Office Action dated Jan. 8, 2008 in U.S. Appl. No. 10/762,680.
Office Action dated Jan. 23, 2008 from U.S. Appl. No. 11/747,839.
Notice of Allowance dated Jan. 29, 2008 in U.S. Appl. No. 10/726,802.
Notice of Allowance dated Mar. 5, 2008 in U.S. Appl. No. 10/909,103.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 in EP Application No. 04252054.4.
Chinese Office Action dated Mar. 28, 2008 in Chinese application No. 200410044503.5.
European Search Report dated Mar. 28, 2008 from EP Application No. 04252203.7.
European Search Report dated Mar. 28, 2008 from EP Application No. 04252057.7.
European Search Report dated Apr. 3, 2008 from EP Application No. 04252205.2.7.
Chinese Office Action dated Apr. 4, 2008 in Chinese Application No. 200410047784.X.
Office Action dated Apr. 9, 2008 from U.S. Appl. No. 10/909,027.
Notice of Allowance dated Apr. 25, 2008 from U.S. Appl. No. 10/726,802.
Office Action dated May 23, 2008 from Chinese Patent Application No. 200410071498.7.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 23, 2008 from U.S. Appl. No. 10/762,680.
Chinese Office Action dated Jun. 27, 2008 from Chinese Patent Application No. 200410038432.8.
Chinese Office Action dated Jun. 27, 2008 in Chinese Application No. 200410038546.2.
Office Action dated Jun. 27, 2008 from U.S. Appl. No. 10/909,085.
Search Report dated Jun. 30, 2008 in EP Application No. 08155262.2.
Search Report dated Jul. 2, 2008 in EP Application No. 08155263.0.
Office Action dated Jul. 2, 2008 from European Patent Application No. 04252205.2.
Office Action dated Jul. 4, 2008 from Chinese Patent Application No. 200410038545.8.
Search Report dated Jul. 10, 2008 from European Patent Application No. 08153726.8.
Search Report dated Jul. 21, 2008 from European Patent Application No. 08153724.3.
Office Action dated Aug. 1, 2008 in U.S. Appl. No. 10/909,027.
Office Action dated Aug. 8, 2008 from Chinese Patent Application No. 200410045686.2.
Office Action dated Aug. 8, 2008 from Chinese Patent Application No. 200410087460.9.
Office Action dated Aug. 19, 2008 from U.S. Appl. No. 10/726,440.
Office Action dated Aug. 29, 2008 from U.S. Appl. No. 11/742,387.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl. No. 10/762,680.
Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
High-bandwidth Digital Content Protection System, Revision 1.0, Intel Corporation, Feb. 17, 2000.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Fairchild Semiconductor, "AN-5017 LVDS Fundamentals," Application Note, Dec. 2000, Revised Jun. 2005, 5 pages.
Elliott Cole, "LVDS Multidrop Connections," Application Report SLLA054A, Feb. 2002, 32 pages.
U.S. Appl. No. 61/177,979, filed May 13, 2009.

\* cited by examiner

METHOD AND APPARATUS FOR POWER SAVING DURING VIDEO BLANKING PERIODS

CROSS REFERENCE TO RELATED APPLICATIONS

This patent application takes priority under 35 U.S.C. 119 (e) to (i) U.S. Provisional Patent Application No. 61/177,979, filed on May 13, 2009 entitled "Flat Panel Display Power Reduction Method" by Osamu Kobayashi, which is hereby incorporated by reference in its entirety.

TECHNICAL FIELD

The present invention relates generally to communication methodologies and systems enabling display devices to execute power save procedures during regular modes of operation. More particularly, methods, software, hardware, and systems are described for implementing power saving while displaying audio-video signal.

BACKGROUND OF THE INVENTION

Currently, multimedia networks are relatively unsophisticated in their management of power saving in display devices. As laptops, electronic notebooks, and other devices with limited power supplies become more prevalent the demand for devices having improved power management in their associated displays increases.

In existing display systems and devices, video signals are transmitted to display devices for display. Such video signals include a pattern of active signals and interspersed with blanking periods. During the active periods signal information is provided containing displayable information. The blanking periods that accompany the active periods include horizontal blanking periods which demarcate line ends for the video signal. They also include horizontal blanking periods which are generally longer and demarcate frame boundaries for the video signal. During the blanking periods displayable signal is not provided.

During the active portion of the video signal, the transmitted displayable video information requires a significant amount of power consumption. The blanking periods also require a non-trivial amount of power in current implementations. In a low power usage environment, ways of reducing power consumption in all areas can be very advantageous.

While existing systems and methods work well for many applications, there is an increasing demand for display methodologies that enable increased power savings in a wider range of operational circumstance and with far greater capacity to fully enjoy the benefits of modern multimedia equipment, software and devices. This disclosure addresses some of those needs.

SUMMARY OF THE INVENTION

In one aspect, an integrated circuit package configured to operate in a display device. The package includes an input interface circuitry configured to receive an audio-video data stream having video signal including timing information associated with the video signal. And also includes a timing extraction circuitry configured to identify a blanking pattern for the video signal using the timing information where the blanking pattern comprising active periods and blanking periods. The timing control circuitry configured to implement a power saving process so that during the blanking periods of the video signal the power saving process instructs selected systems associated with video display to terminate powered operation during the blanking period.

In a system embodiment the invention comprises input processing circuitry configured to receive an audio-video data stream having video signal including timing information associated with the video signal and convert the audio-video data stream to a differential video signal. The system also includes timing extraction circuitry to identify blanking patterns for the differential video signal using the timing information with the blanking pattern comprising active periods and blanking periods. The system also includes timing control circuitry configured to synchronize and transmit the differential video signal and to implement a power saving process so that during the blanking periods of the differential video signal the power saving process instructs selected systems associated with the video display system to terminate powered operation during the blanking period. The system can further include a plurality of column drivers in communication with the timing control circuitry and configured to receive the differential video signal from the timing control circuitry.

In another aspect of the invention, the invention describes a method of conducting power saving in an integrated circuit package configured to operate in a video display system. The method includes receiving an audio-video data stream that includes video signal and timing information associated with the video signal. Identifying a blanking pattern, comprising active periods and blanking periods for the video signal, using the timing information. Implementing power saving so that during the blanking periods of the video signal, the power saving process enables selected systems to terminate powered operation during at least a portion of the blanking period thereby reducing power expenditures.

In another aspect, the invention comprises a computer implementable method, embodied on a tangible computer readable media. The method comprising computer readable instructions for conducting power saving in display system. The computer readable instructions comprising instruction for receiving an audio-video data stream that includes video signal and timing information associated with the video signal. Identifying a blanking pattern, comprising active periods and blanking periods for the video signal, using the timing information. Implementing power saving so that during the blanking periods of the video signal, the power saving process enables selected systems to terminate powered operation during at least a portion of the blanking period thereby reducing power expenditures. Such instruction can be configured as firmware, hardware, or software embodied on a computer readable media.

General aspects of the invention include, but are not limited to methods, systems, apparatus, and computer program products for enabling power saving in display systems and devices.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF PREFERRED EMBODIMENTS

Reference is made to particular embodiments of the invention. Examples of which are illustrated in the accompanying drawings. While the invention will be described in conjunction with particular embodiments, it will be understood that it is not intended to limit the invention to the described embodiments. To contrary, the disclosure is intended to extend to cover alternatives, modifications, and equivalents as may be included within the spirit and scope of the invention as defined by the appended claims.

Figure 1:
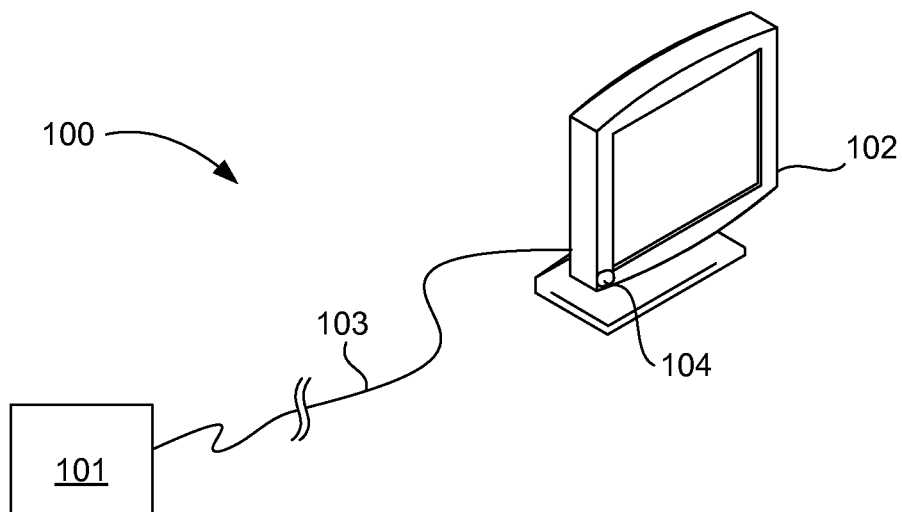
FIG. 1 illustrates a simplified embodiment of a display system networked with a multi-media source device.

Aspects of the invention pertain to methods and systems for enabling power saving in display devices in electronic systems to include multimedia systems. In the ordinary operation of such systems, a display device is coupled (directly or indirectly) with a source device that provides video content. FIG. 1 illustrates a highly simplified example of multimedia network 100 comprising a source device 101 and a display 102 linked by a data link 103.

Example source devices 101 include, but are not limited to any device capable of producing or transmitting video content. In embodiments of this invention, the video content shall be interpreted broadly to encompass any video data configured in any data format. Accordingly, such video content can include, but is not limited to, video, image data, animation, text, audio (sound, music, etc.) and interactive content, as well as combinations of all of the foregoing. Again, in general, source devices 101 are those devices that capture, generate, or transmit multimedia (to include video) content. Particular examples include, but are not limited to set top boxes, DVD players, cameras, video recorders, game platforms, computers, HD video devices, VCR devices, radio, satellite boxes, music players, content capture and content generation devices, and many other such source devices beyond those referenced above. Such devices can transmit video data in a number or different data formats, including, but not limited to VGA (and its analogs), HDMI, DisplayPort, CVBS, as well as many other formats.

Display 102 embodiments of the invention include display support circuitry 104 that couple the link 103 (and therefore the source 101) to the display 102. The display support circuitry 104 enables communication between the display 102 and the source 101.

Figure 2:
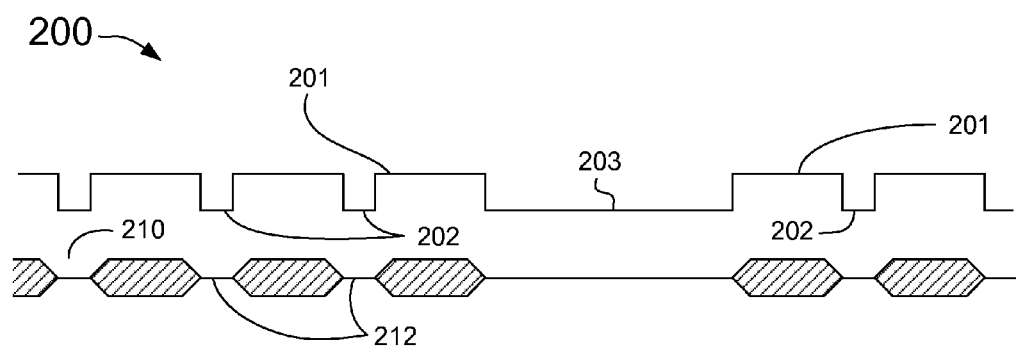
FIG. 2 illustrates a timing diagram illustrating the blanking intervals and LVDS cycle that can be used to regulate power saving in a display device in accordance with the principles of the invention.

In embodiments of the invention, the source 101 outputs an audio-video data stream having video signal and associated timing information. FIG. 2 includes a schematic depiction of a video data stream in accordance with the principles of the invention. FIG. 2 is a schematic depiction of a portion of a video data stream 200 transmitted perhaps to the display 102 of FIG. 1. The depicted portions of stream 200 schematically depict a blanking cycle for a video signal. Portions 201 define portions of the signal containing valid video data. Also shown are the horizontal blanking intervals (HBI or H-blanking) 202 which occur at regular intervals. Also shown are the vertical blanking intervals (VBI or V-blanking) 202 which occur at regular intervals and define video frame boundaries. Stream 210 is a depiction of the blanking cycle described using differential signaling. The portions 212 associated with the V-blanking intervals contain no data or non-video data. Such non-video data can comprise useful information or nothing at all.

A number of packet based delivery systems are suitable for use in accordance with the principles of the invention. In one example, such a packet based delivery and communication scheme is described in U.S. patent application Ser. No. 10/726,794 entitled "PACKET BASED VIDEO DISPLAY INTERFACE AND METHODS OF USE THEREOF" filed Dec. 2, 2003. This disclosure is incorporated by reference herein for all purposes and describes an approach to packet based communications in accordance with some embodiments of the invention.

Figure 3:
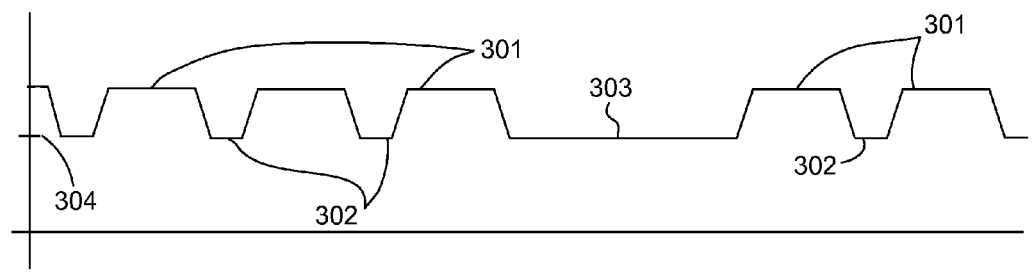
FIG. 3 is a timing diagram that illustrates power consumption in a display device over time.

Associated FIG. 3 depicts power consumption during the same cycle as described in FIG. 2. The power consumption is greatest during the valid data transmission intervals 301 and drops significantly during the blanking cycles 302, 303. Under current implementations the power consumption during these blanking intervals is still quite substantial. Using current approaches, this baseline level 304 of power consumption is helpful in preventing noise spikes during switching and also addresses EMI (electro-magnetic interference) problems during such spikes.

Figure 4:
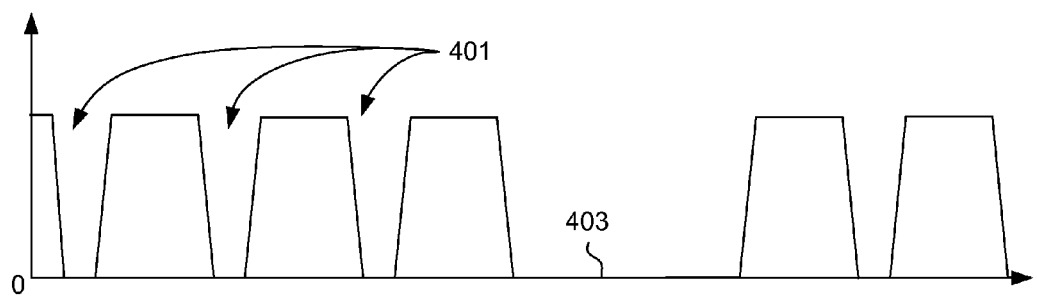
FIG. 4 is a timing diagram that illustrates the reduced power consumption realized by the application of power saving embodiments operating in accordance with the principles of the invention of the invention.

The inventors propose that the power during the blanking intervals be substantially reduced. By shutting down, or selectively reducing power to, selected circuit elements of the display substantial power savings can be obtained even during the operation of a display device. FIG. 4 is a simplified illustration of such power savings. In this example, the power in the blanking intervals 401, 403 is reduced. In the depicted embodiment, the power usage is reduced to zero. In other embodiments, the power reduction need not be so extreme. In any case, the average power is reduced enabling a power saving that is substantially greater than the prior art.

Figure 5:
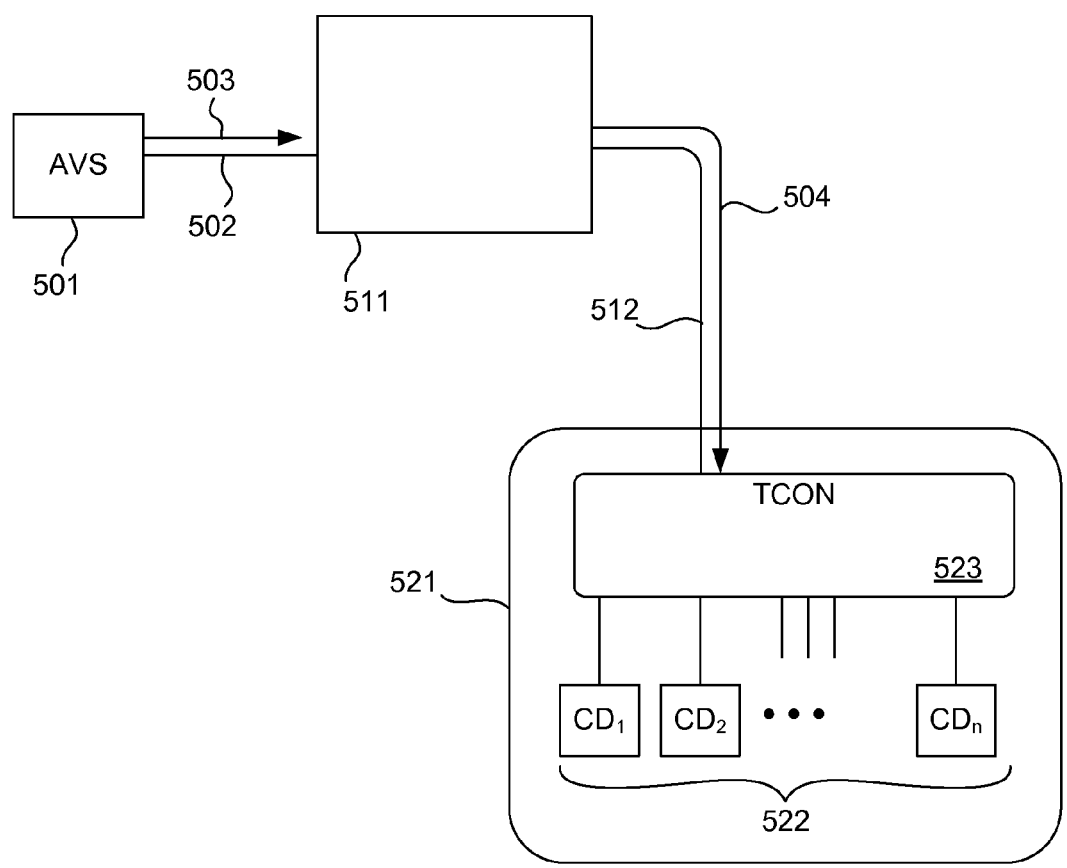
FIG. 5 is a system diagram showing the various blocks of a display system implemented in accordance with the principles of the invention.

One apparatus embodiment for implementing power saving is illustrated in FIG. 5. A depicted arrangement of components includes an audio-video source device 501 connected to input interface circuitry 511 using a data link 502. The source 501 can be one of many different type audio-video systems. DVD players, set top boxes, game consoles, and a huge array of other devices known to persons of ordinary skill in the art. Such devices 501 can transmit data in accord with any of a number of different data formats and/or interfaces including, but not limited to HDMI, CVBS, VGA, Display- Port and many other signal formats. The input interface circuitry 511 can also be configured to receive inputs from keyboards, USB ports, IR actuated devices (e.g., remote control interfaces), and so on. In the depicted arrangement, the source transmits an audio-video data stream 503 that includes audio signal and encoded timing information. In one example format, the data stream 503 is encoded in an 8b/10b format. Moreover, this transmission format can be a packet based format. The input interface circuitry 511 is typically configured as a system-on-a-chip designed to convert the received data into a format or a timing compatible with a format or timing of a display panel 521. In some embodiments, a display system will have more than one set of input interface circuitry 511 depending on the characteristics of the panel 521 or the network that the panel 521 belongs to. For example, the panel 521 can be configured to operate at 60 Hz, 120 Hz or even 240 Hz. Typically, a separate input interface processor 511 is provided for each operating frequency.

In some embodiments, the audio-video data stream 503 is an 8b/10b encoded signal received by the input interface circuitry 511. In some embodiments, the 8B/10B signal is transmitted (as 504) to a timing controller 523 without modification. Alternatively, can be converted to an 8 bit signal and then transmitted. Also, in some embodiments the interface circuitry 511 can convert the signal to a differential signal such as a low voltage differential signal (LVDS). In other embodiments, the audio-video data stream 503 can be converted to other formats.

The input interface circuitry 511 is coupled to a timing controller (TCON) 523 of the panel 521 with a data link 512. The data stream 504 output from the interface circuitry 511 is received by the TCON 523 which processes the data and then outputs the information to an array of column drivers 522 which control the display of data on the panel 521. It should be noted that the TCON can receive the 8B/10B coded signal or a decoded 8 bit signal as well as differential signal from the input interface circuitry 511 as well as other non-differential signals. In addition, the TCON 523 transmits video information to the column drivers 522 of the panel 522. The information can be transmitted in 8B/10B format, also, advantageously, it can be transmitted in a LVDS format. Other formats and encoding can be used. The inventors point out that the TCON and its function can be embodied in a system of a chip construction. In a related point, the applicants point out that the entire system 511, 512, 523, can be integrated onto a single chip in a system on a chip fashion if so desired.

In accord with the present invention, power saving can be achieved by selectively turning off of various systems and circuitry during operation. In particular, these systems are turned off (or supplied less power) during the blanking intervals. It is expressly pointed out that the timing information can be obtained or identified at the input interface 511 or at the timing controller 523. Moreover, that the power saving can be implemented at the input interface 511 or at the timing controller 523.

Figure 6A:
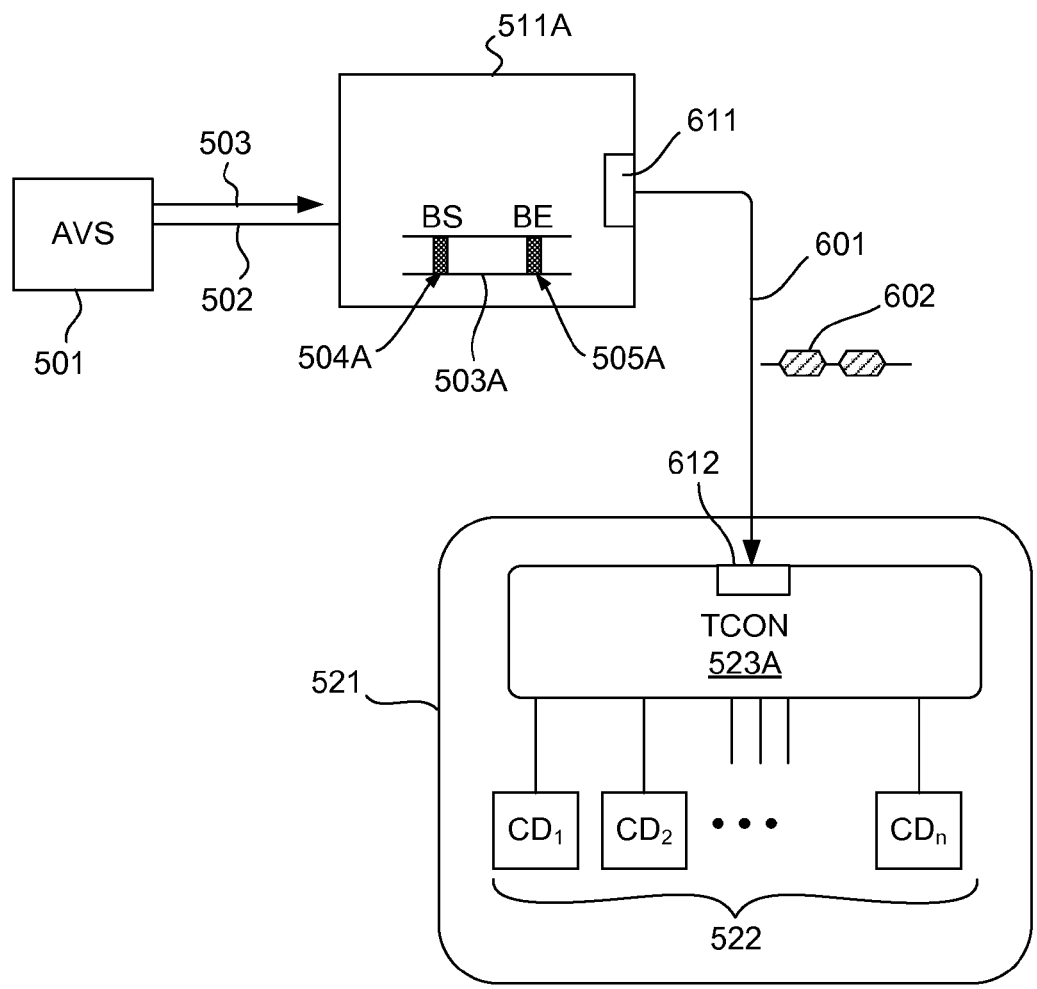
FIG. 6A is a system diagram illustrating one approach for obtaining blanking cycle information and then applying it to a power saving application in accordance with the principles of the invention.

As further explained with respect to FIG. 6A, a first power saving embodiment is described. A source device 501 sends an audio-video data stream 503 in source data format over a data link 502 to an embodiment of input interface circuitry 511A. The data stream 503 includes video signal and timing data. In the depicted embodiment, the input interface circuitry 511A receives the data stream 503 and then decodes it to determine the blanking cycle for the decoded video signal which is schematically depicted as 503A. Timing extraction circuitry reads the data stream and extracts the timing information usable for identifying a blanking parent. The timing extraction circuitry can form part of the input interface 511 and also can form part of the timing controllers 523. In this embodiment, the timing information is obtained by identifying the blanking start (BS) symbols 504A and blanking end (BE) symbols 505A for the decoded signal 503A. These start and end symbols (504A, 505A) comprise timing information that can be used to establish a blanking cycle for the received data signal 504A. This timing information can be used to control the activity of the TCON 523. In particular, it can be used to generate a timing signal (schematically depicted by 602) that is provided to a TCON 523 which enables, among other things, control of the line buffers and the shift registers and the column drivers 522. Also, it controls the operation of the frame buffers and associated circuitry of the panel 521.

In this embodiment, the timing signal 602 is generated by the processing circuitry of the input interface circuitry 511A. In one example, the signal 602 can be received or generated by a GPIO 611. For example, the timing signal 602 can be sent via an output pin of the GPIO 611 which is coupled 601 with a pin of a GPIO 612 of the TCON 523A.

The timing signal 602 can now be used at the panel 521 to implement power saving. During the blanking cycle, the TCON 523A can for example be turned off. The column drivers can be turned off or receive reduced power. Other panel systems or logic blocks can also be turned off during the blanking periods of the timing signal 602 if desired.

The inventors point out that the input interface circuitry 511 (511A, 511B) can be configured to transmit the received data stream 503 in its original format or convert it to another format. One particularly advantageous format suggested by the inventors is a low voltage differential signal (LVDS) which has numerous power saving advantages and reduced EMI properties.

Figure 6B:
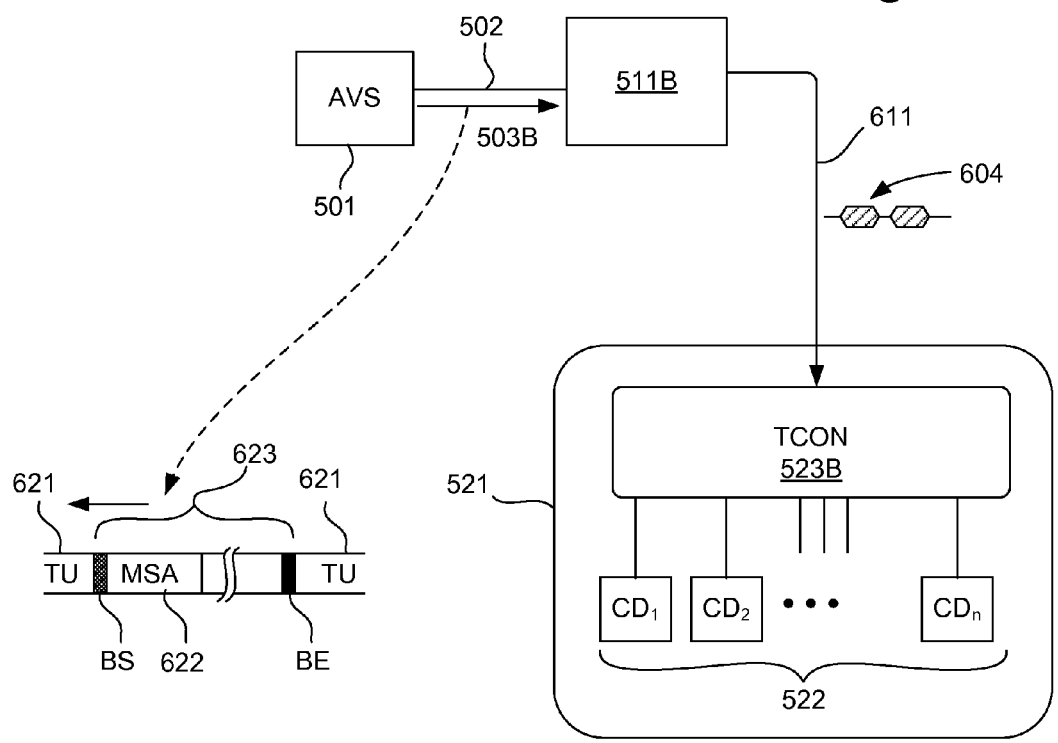
FIGS. 6B and 6C show a system diagram illustrating another approach for obtaining blanking cycle information from an encoded MSA and then applying it to a power saving application in accordance with the principles of the invention.
Figure 6C:
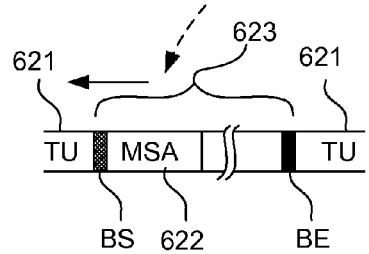

In another approach, outlined briefly with respect to a discussion of FIG. 6C, the data received from the source device 501 can include power saving instructions and/or include timing information encoded in a somewhat different manner. Again, using the timing information, power saving can be achieved by the selective turning off of various systems and circuitry during the blanking intervals.

With continued reference to FIG. 6B, source device 501 sends an audio-video data stream 503 in source data format over a data link 502 to an embodiment of input interface circuitry 511B. The data stream 503 includes video signal and timing data. However, in the depicted embodiment the timing information is encoded into a Main Stream Attribute (MSA) packet(s) of a data stream 503. Examples of such approaches for formatting such MSA packets and the data transmission methodologies associated therewith are explained in greater detail in, for example, in U.S. patent application Ser. No. 10/726,794 entitled "PACKET BASED VIDEO DISPLAY INTERFACE AND METHODS OF USE THEREOF" filed Dec. 2, 2003 already incorporated herein.

During a handshake protocol between the source 501 and display, the input interface circuitry 511B receives configuration data from the source during the protocol. The circuitry 511A decodes the data and uses information in the data stream to decode the received signal. This enables the circuitry 511A and/or the TCON 523A to be correctly configured to properly display the video signal. In one particular approach, the necessary configuration is provided to the input interface circuitry 511B in a MSA packet that is decoded in the handshake protocol. Specific to this embodiment, the MSA includes timing information that can be used to identify the timing for the blanking intervals.

The input interface circuitry 511B receives the data stream 503 and decodes the MSA to determine the blanking cycle for the decoded video signal which is schematically depicted as 503B. As shown in FIG. 6C, in one embodiment, the data stream 503B comprises a stream of transfer units 621 transmitted in the active portion of the data stream. This is broken up by the vertical and horizontal blanking intervals. Here, the MSA 622 is inserted as one or more data packets in a vertical blanking interval 623. As before, the blanking intervals are delineated by blanking start (BS) and blanking end (BE) markers. The remainder of the blanking interval 623 can contain other non-displayed data or information or can be filled with dummy data.

The MSA can comprise timing information that can be used to establish a blanking cycle for the received data signal. As before, this timing information contained within the MSA can be used to control the activity of the TCON 523B. In particular, it can be used to generate a timing signal (schematically depicted by 604) that is provided to a TCON 523B which enables, among other things, control of the line buffers and the shift registers and the column drivers 522 as well as the TCON itself. Also, it controls the operation of the frame buffers and associated circuitry of the panel 521.

In this embodiment, the timing information can be encoded simply within the MSA 622. In one example, the MSA can include information defining a format it can be coded as follows. A timing pattern can be indicated. In one example, 1080p (or other display format) or some other format can be designated. A total vertical period ($V_{total}$) can be specified. For example, using a 1080 signal, $V_{total}$ can be characterized as 1125 lines with a displayable height $V_{height}$ of 1080 for vertical blanking Vblank of 45 line periods. Similarly, a total horizontal period ($H_{total}$) can be specified. For example, using a 1080 signal, $H_{total}$ can be 2200 pixels with a displayable width $H_{width}$ of 1920 pixels such that the Hblank period is 300 pixels. This timing is also tied to the refresh rates and capabilities of the panel. Many different approaches could be used.

Figure 7:
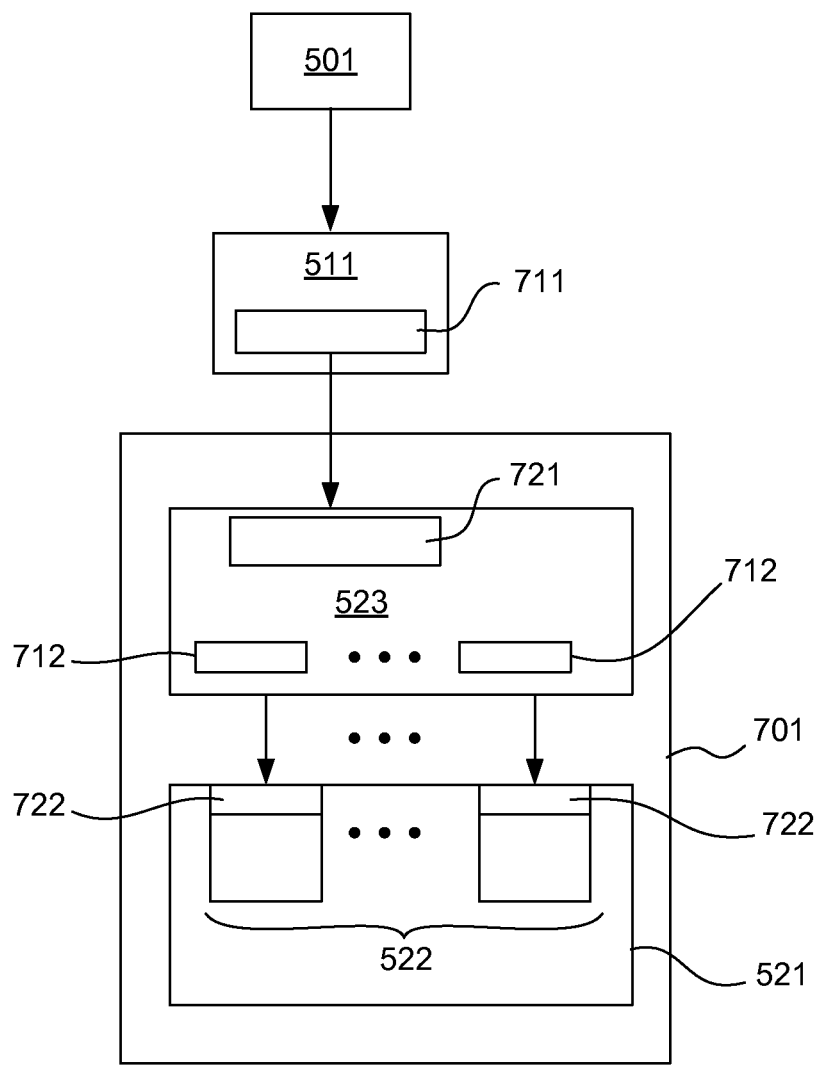
FIG. 7 illustrates a controlled approach to power saving using a system diagram to show how one embodiment of the invention can implement power saving in accordance with the principles of the invention.

During the blanking periods portions of the circuitry can be turned off. Referring briefly to FIG. 7, an audio-video source device 501 supplies data (including video data and associated timing information) to input interface circuitry 511 using a data link. The input interface circuitry 511 is typically configured as a system-on-a-chip designed to convert the received data into a format or a timing compatible with a format or timing of a display panel 521. In some embodiments, the interface circuitry 511 forms part of a display device 701. Alternatively (as shown here), it is not required to be integral to the device 701. The input interface circuitry 511 includes signal transmission circuitry 711 enabling transmission of the data stream to the timing controller 523 of the display device 701. The timing controller 523 includes receiver circuitry 721 for receiving the signal and timing information from the input interface circuitry 511. The timing controller 523 includes a plurality of signal transmitters 712 transmitting video data to the plurality of column drivers 522 of the display panel 521. Each column driver 522 includes receiver circuitry 722 for receiving the signal and timing information from the controller 523. The timing controller 523 and its concomitant circuitry (e.g., 712, 721, and so on) can be configured as a system on a chip. Each of the transmitters 711, 712 and receivers 721, 722 consume power whether they are sending valid data or not. These devices consume most of the power budget. Thus, power saving can be achieved in accordance with the principles of the invention by turning off some or all of the transmitters 711, 712 and receivers 721, 722 during the blanking periods.

The prior portions of this patent have disclosed methods for identifying the blanking periods. The transmitters 711, 712 and receivers 721, 722 as well as other elements and logic blocks (e.g., the column drivers 522) can be turned off during these identified blanking periods. Importantly, some, all, or none of these components can be turned off to obtain varying levels of power savings. The components are turned back on when they are needed to process, transmit, receive, or otherwise interact with data. This power saving can be specified as an automatic response forming part of the instruction set that operates the input interface circuitry 511, the timing controllers 523, or the column drivers 522. Also, the power can be turned off in accordance with power off instructions provided by the source 501 or encoded into the data stream itself.

Also, as pointed out previously, this power saving can be achieved using systems where the communication between the TCON 523 and the column drivers 522 is achieved with differential signaling. For example, the TCON 523 can transmit data to the column drivers 522 as low voltage differential signals (LVDS). In one embodiment, the LVDS can be delivered in a serial data stream to all of the column drivers. Such an LVDS signal is compliant with the TIA/EIA 644 standard. Modes of operation of such systems are known in the art. For example, a Fairchild Semiconductor Application Note entitled "AN-5017 LVDS Fundamentals" dated December 2000, available at http://www.fairchildsemi.com/an/AN/AN-5017.pdf is instructive and hereby incorporated by reference.

For increased speed, the LVDS can be configured with a transmitter coupled with a plurality of column drivers in a multi-drop LVDS connection. Such arrangements are also known in the industry. For example, a Texas Instruments Application Report by Elliott Cole entitled "LVDS Multidrop Connections" dated February 2002, available at http://focus.ti.com/lit/an/slla054a/slla054a.pdf is also incorporated by reference.

In another implementation, each transmitter 712 of the timing controller 523 is coupled with an associated column driver 722 in a parallel arrangement of point-to-point LVDS connections. In another approach, the transmitters can be coupled with each column driver using a multi-channel packet based communication connection with embedded self-clock. Each channel being characterized by uni-directional data pairs in a main link. Such a link can also feature a bi-directional auxiliary channel. One example of such a link is a link compatible with the DisplayPort family of connectors. In this implementation the transmitted data can have 8B/10B channel coding.

The inventors point out that the TCON (523, 523A, 523B) can be configured as a system on a chip package. Also, the input interface circuitry 511 and the TCON (e.g., 523, 523A, 523B) can be integrated together in a single system on a chip package.

Figure 8:
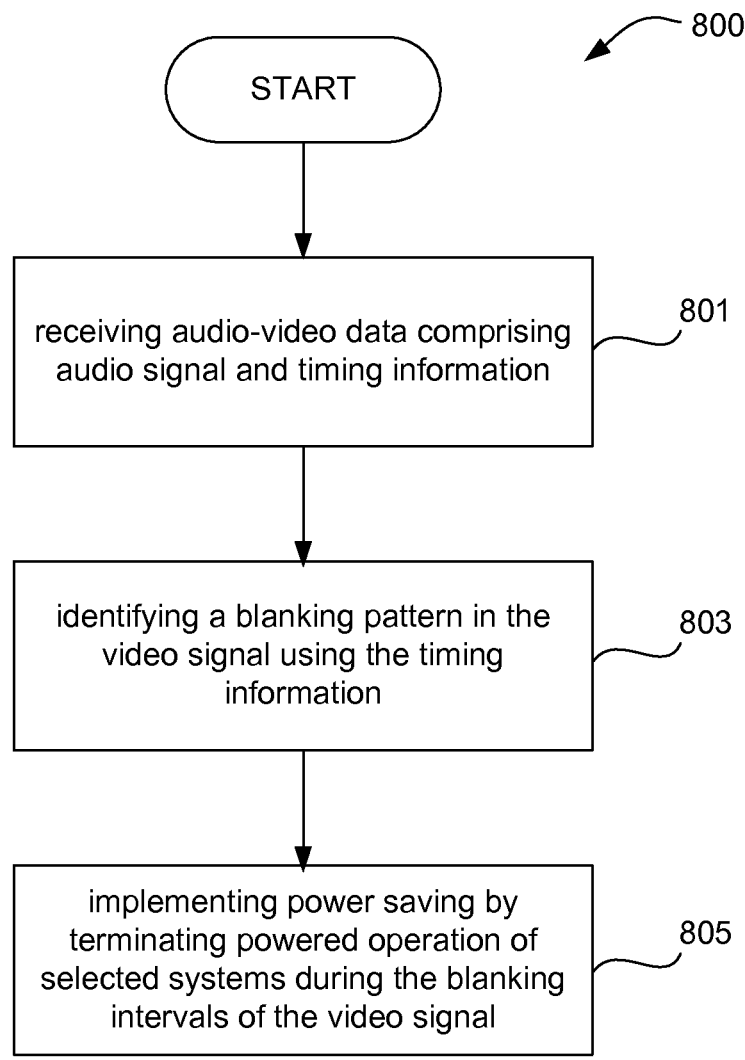
FIG. 8 is a flow diagram illustrating one approach to implementing power saving in a display system in accordance with the principles of the invention.

FIG. 8 depicts one example mode of operation for aspects of the invention. A process 800 for achieving power saving during the operation is described. An audio-video data stream is received by a display device (Step 801). As indicated above, audio-video data stream (e.g., 503) includes an audio-video signal and timing information. The data can be in any format, but in one embodiment is subject 8B/10B encoding. The receiving device (typically a display device, or circuitry ancillary to a display) identifies the blanking pattern of the audio video data (Step 803). This can be achieved by a direct read of the blanking pattern (i.e., processing the BS, BE indicators) to generate the blanking pattern. This can also be achieved by decoding of timing information encoded in MSA packets of the audio-video signal. These can be read and translated into a blanking pattern associated with the video signal. Details of some embodiments of these approaches have been disclosed in fuller detail in the preceding paragraphs. The inventors point out that other methods of determining the blanking pattern can also be employed.

Power saving is then implemented (Step 805). In one embodiment, power saving instructions can be employed to reduce display system power consumption during the blanking intervals of the audio video signal. Various system components of the display system are simply powered down during the blanking interval and then powered up again for operation during the active intervals between the blanking intervals. Example system blocks that can be powered down during the operation of the display include, but are not limited to the interface circuitry 511 (e.g., 511A, 511B) the TCON 523 (e.g., 523A, 523B), the column drivers 522, the receivers and transmitters (e.g., 711, 712, 721, 722). These power down instructions can be simply standardized as part of the normal display system operation. In other words, power to selected display systems can be temporarily terminated during blanking as part of the ordinary system operation. Also, specific power down instructions can be sent to a display device as part of the instructions contained in a data stream. Moreover, it can be configured to be adjusted as part of set up operations. Also, such instructions can be coded into the audio video data if desired. Thus, the power saving process can be automatic, selective, adjustable, and be determined remotely as instructions forming part of the audio-video data. Such power save instructions can be written into the firmware of the display systems or chips or can be part of the system software.

In addition, embodiments of the present invention further relate to integrated circuits and chips (including system on a chip (SOC)) and/or chip sets. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An integrated circuit package configured to operate in a video display device, and package comprising:
   input interface circuitry configured to receive a packetized audio-video data stream having video signal including timing information associated with the video signal;
   timing extraction circuitry configured to identify a blanking pattern for the video signal using the timing information, the blanking pattern comprising active periods and blanking periods, wherein the blanking pattern is determined from a main stream attribute packet included in the packetized audio-video data stream; and
   timing control circuitry configured to implement a power saving process so that during the blanking periods of the video signal the power saving process instructs selected systems associated with the video display to terminate powered operation during the blanking period, wherein the timing control circuitry is configured to output the video signal as a serial signal to a plurality of column drivers.

2. An integrated circuit package as recited in claim 1 wherein the timing extraction circuitry uses blanking start and blanking stop indicators of the video signal to identify the blanking pattern for the video signal.

3. An integrated circuit package as recited in claim 2 wherein the package includes a dedicated timing transmission pin for transmitting the blanking pattern for the video signal; and
   a dedicated timing receiver pin for receiving the transmitted blanking pattern and forwarding the blanking pattern to the timing control circuitry.

4. The integrated circuitry package of claim 1, further including input processing circuitry configured to receive an audio-video data input and convert the audio-video data input into a differential signal that is output as the audio-video stream.

5. The integrated circuit package of claim 4, wherein the input processing circuitry converts the audio-video data input into a low voltage differential signal (LVDS).

6. The integrated circuit package of claim 4, wherein the package is configured to output the low voltage differential signal (LVDS) to the plurality of column drivers using a LVDS multi-drop bus.

7. The integrated circuit package of claim 1, wherein the timing control circuitry is configured to output the video signal as a plurality of point to point low voltage differential signals using a plurality of parallel connections that each deliver a portion of the video signal an associated one of a plurality of column drivers.

8. A video display system comprising;
   input processing circuitry configured to,
      receive a packetized audio-video data stream having video signal including timing information associated with the video signal, and
      convert the audio-video data stream to a differential video signal;
   timing extraction circuitry configured to identify a blanking pattern for the differential video signal using the timing information, the blanking pattern comprising active periods and blanking periods, wherein the blanking pattern is determined from a main stream attribute packet included in the packetized audio-video data stream;

timing control circuitry configured to synchronize and transmit the differential video signal and to implement a power saving process so that during the blanking periods of the differential video signal the power saving process instructs selected systems associated with the video display system to terminate powered operation during the blanking period; and a plurality of column drivers in communication with the timing control circuitry and configured to receive the differential video signal from the timing control circuitry.

9. The system recited in claim 8 wherein the timing extraction circuitry uses blanking start and blanking stop indicators of the differential video signal to identify the blanking pattern for the differential video signal.

10. The system recited in claim 8 wherein the timing control circuitry implements said power saving by instructing the column drivers to terminate powered operation during the blanking period.

11. A method of implementing power saving in an integrated circuit package configured to operate in a video display device, the method comprising:

receiving a packetized audio-video data stream having including video signal and timing information associated with the video signal;

identifying a blanking pattern for the video signal using the timing information, the blanking pattern comprising active periods and blanking periods, wherein the blanking pattern is determined from a main stream attribute packet included in the packetized audio-video data stream; and implementing power saving so that during the blanking period of the video signal the power saving process enables selected systems to terminate powered operation during at least a portion of the blanking period, wherein the method is implemented in a display device including a timing controller and a plurality of column drivers and wherein said implementing of power saving terminated powered operation of at least one of the timing controller and the plurality of column drivers during the blanking periods.

12. The method of claim 11 wherein the identifying a blanking pattern for the video signal using the timing information comprises identifying blanking start and blanking stop indicators of the video signal and determining a blanking pattern using the blanking start and blanking stop indicators.

13. The method of claim 11 wherein the identifying of blanking pattern for the video signal using the timing information comprises identifying the main stream attribute identifier in the video.

14. The method of claim 11 wherein at least one of the timing controller and the plurality of column drivers receive audio-video signal as a low voltage differential signal.

15. The method of claim 14 wherein the low voltage differential signal is transmitted by transmitters of the timing controller and received by a plurality of receivers of the plurality of column drivers and wherein implementing of power saving terminates powered operation of at least one of the transmitters of the timing controller and the plurality of receivers of the plurality of column drivers.

16. A computer implementable method for implementing power saving, the method embodied on a tangible computer readable media and comprising non-transitory computer readable instructions for:

receiving a packetized audio-video data stream having including video signal and timing information associated with the video signal;

identifying a blanking pattern for the video signal using the timing information, the blanking pattern comprising active periods and blanking periods, wherein the blanking pattern is determined from a main stream attribute packet included in the packetized audio-video data stream;

implementing power saving so that during the blanking periods of the video signal the power saving process instructs selected display systems to terminate powered operation during at least a portion of the blanking period, wherein the instructions are implemented on a display system including a timing controller and a plurality of column drivers and wherein said instructions for implementing of power saving terminates powered operation of at least one of the timing controller and the plurality of column drivers during the blanking periods.

17. The computer implementable method of claim 16 wherein the instructions for identifying the blanking pattern comprises instructions for identifying blanking start and blanking stop indicators of the video signal and instructions for determining a blanking pattern using the blanking start and blanking stop indicators.

18. The computer implementable method of claim 16 wherein the instructions for identifying the blanking pattern for the video signal using the timing information comprises identifying the main stream attribute identifier in the video signal.

19. The computer implementable method of claim 16 wherein at least one of the timing controller and the plurality of column drivers receive audio-video signal as a low voltage differential signal and wherein the low voltage differential signal is transmitted by transmitters of the timing controller and received by a plurality of receivers of the plurality of column drivers and wherein the instructions for implementing of power saving terminate powered operation of at least one of the transmitters of the timing controller and the plurality of receivers of the plurality of column drivers.

20. The computer implementable method of claim 16 wherein the instructions are implemented on an integrated circuit device of display system.

21. The computer implementable method of claim 16 wherein the computer readable instructions are implemented as firmware on an integrated circuit.

\* \* \* \* \*